(12) United States Patent
Liw

(10) Patent No.: US 11,226,394 B2
(45) Date of Patent: Jan. 18, 2022

(54) DIRECTION FINDING SYSTEM AND METHOD FOR RADIO DIRECTION FINDING OF A TARGET

(71) Applicant: Rohde & Schwarz GmbH & Co. KG, Munich (DE)

(72) Inventor: Sean Ian Liw, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 179 days.

(21) Appl. No.: 16/215,904

(22) Filed: Dec. 11, 2018

(65) Prior Publication Data

US 2019/0178979 A1 Jun. 13, 2019

(30) Foreign Application Priority Data

Dec. 12, 2017 (EP) .................................... 17206768

(51) Int. Cl.
*G01S 5/04* (2006.01)
*G01S 5/02* (2010.01)

(52) U.S. Cl.
CPC .............. *G01S 5/04* (2013.01); *G01S 5/0221* (2013.01); *G01S 5/0252* (2013.01); *G01S 5/02521* (2020.05); *G01S 5/02524* (2020.05)

(58) Field of Classification Search
CPC .... G01S 5/04; G01S 5/02521; G01S 5/02524; G01S 5/0252; G01S 5/06
See application file for complete search history.

(56) References Cited

U.S. PATENT DOCUMENTS

| | | | | |
|---|---|---|---|---|
| 7,116,988 B2* | 10/2006 | Dietrich | ................ | G01S 5/0221 455/456.1 |
| 7,236,128 B2* | 6/2007 | Sugar | .................... | G01S 5/0226 342/174 |
| 7,293,088 B2* | 11/2007 | Douglas | ................ | H04W 64/00 709/224 |
| 8,089,407 B2* | 1/2012 | Chen | ..................... | G01S 5/0252 342/454 |

(Continued)

OTHER PUBLICATIONS

Ezzati, N. et al. "Optimised Sensor Network for Transmitter Localisation and Radio Environment Mapping." IET Communications 2016 vol. 10 Issue 16. pp. 2170-2178. (Year: 2016).*

(Continued)

*Primary Examiner* — Gregory C. Issing
(74) *Attorney, Agent, or Firm* — Christensen O'Connor Johnson Kindness PLLC

(57) ABSTRACT

A direction finding system for radio direction finding of a target emitting at least one signal is described. The direction finding system comprises at least one receiver unit, at least one antenna assigned to the at least one receiver unit and a central processing unit connected to the at least one receiver unit. The at least one receiver unit is configured to measure an absolute receiving power or a relative receiving power of the at least one signal emitted by the target. The central processing unit is configured to determine the power level of the respective power received by the at least one receiver unit. The central processing unit is further configured to determine interpolated constant power contours in order to locate the target. In addition, a method for radio direction finding of a target emitting electromagnetic at least one signal is described.

12 Claims, 3 Drawing Sheets

(56) References Cited

U.S. PATENT DOCUMENTS

| | | | |
|---|---|---|---|
| 2004/0152471 A1* | 8/2004 | MacDonald | H04W 4/026 |
| | | | 455/456.1 |
| 2008/0045233 A1* | 2/2008 | FitzGerald | G01S 5/0242 |
| | | | 455/456.1 |
| 2009/0005063 A1* | 1/2009 | Malik | H04W 64/00 |
| | | | 455/456.1 |
| 2015/0358936 A1 | 12/2015 | Kao et al. | |
| 2016/0127926 A1 | 5/2016 | Xie et al. | |
| 2017/0219681 A1* | 8/2017 | Ghinamo | H04W 64/00 |

OTHER PUBLICATIONS

Ezzati, N., et al., "Optimised Sensor Network for Transmitter Localisation and Radio Environment Mapping," IET Communications 10(16):2170-2178, Oct. 2016.

* cited by examiner

DIRECTION FINDING SYSTEM AND METHOD FOR RADIO DIRECTION FINDING OF A TARGET

FIELD OF THE DISCLOSURE

Embodiments of the present disclosure relate generally to a direction finding system for radio direction finding of a target emitting at least one electromagnetic signal. Furthermore, embodiments of the present disclosure generally relate to a method for radio direction finding of a target emitting at least one electromagnetic signal.

BACKGROUND

In the state of the art, radio direction finding systems may use the so-called angle of arrival (AoA) technique for locating a target emitting radio frequency signals. Accordingly, the angle of arrival of the signals emitted by the target is determined in order to locate the target appropriately. This technique is useful for long-range radio direction finding wherein expensive radio direction finding antennas are used in combination with a correlative interferometer technique wherein phase differences are measured and compared with a reference data set.

For radio signals with a broader bandwidth, time difference of arrival (TDoA) techniques are typically used with signal correlation in order to determine the location of the target emitting the signals. However, a high bandwidth of in-phase and quadrature data (I/Q data) is required that must be aligned in time. Thus, a number of TDoA sensors positioned in different locations, also called receivers, have to be used which are logged in time via a time stamp, for instance a global positioning system (GPS) time stamp. The several TDoA sensors determine the broadband I/Q data of the radio signal and insert the time stamp onto the I/Q data collected when they receive the respective signal. The I/Q data and the time stamps inserted are processed in order to determine the time difference of arrival of the same signal at the several sensors. The relative time difference of arrival (TDoA) at each of the sensors (receivers) is then used to compute the source of the radio signal. The resolution of this technique is about 200 m to 500 m.

However, a mobile locator setup and handheld receivers are typically used to locate the target (radio signal source) within the so-called last mile detection due to the resolution of the techniques for direction finding mentioned above. For this last mile detection, the location of the target is already determined up to a distance of about one mile as diameter around the estimated location. For the last mile detection, a vehicle with an expensive radio direction finding receiver with an appropriate antenna may be used in order to follow a heat map of the signal to home into the last meters. Subsequently, the last few meters are typically covered on foot to home into the exact location of the target.

Thus, an automated direction finding system is not known in the prior art as at least the last meters have to be covered by human.

Accordingly, there is a need for a direction finding system as well as a method ensuring direction finding in a more automated manner.

SUMMARY

Embodiments of the present disclosure provide a direction finding system for radio direction finding a target emitting at least one signal, comprising at least one receiver unit, at least one antenna assigned to the at least one receiver unit and a central processing unit connected to the at least one receiver unit. The at least one receiver unit is configured to measure an absolute receiving power or a relative receiving power of the signal emitted by the target. The central processing unit is configured to determine the power level of the respective power, namely the absolute receiving power or the relative receiving power, by the at least one receiver unit. The central processing unit is further configured to determine interpolated constant power contours in order to locate the target.

The disclosure addresses the locating of a target within the last meters in an automatic manner, which is typically done manually. Within these last meters, a power of arrival (PoA) technique is used for locating the target. Formerly, the power of arrival technique was considered to be too inaccurate for being used in direction finding systems. However, it turned out that the power of arrival technique can be used with sufficient accuracy for the last meters of the direction finding. Therefore, it is no more necessary that a user of the direction finding system has to cover the last meters manually, for instance on foot, as the direction finding system using the power of arrival technique for the last meters ensures that the target can be located automatically, namely without the need to send one or more persons to find the target by using portable receivers.

In addition, the receiver unit may comprise at least one low cost receiver, in particular consists of low cost receivers, which can be used for the power of arrival technique applied. Accordingly, the whole direction finding system is cost-efficient with regard to the direction finding systems used in the state of the art.

Further, no broadband I/Q data is necessary to locate the target such that a slow data connection is sufficient for transmission of the data required for locating the target, namely the data assigned to the power level measured at a specified time and geolocation.

The interpolated constant power contours, which are determined by the central processing unit, are used to determine the exact location of the target and to visualize it appropriately. The at least one receiver unit measures the absolute receiving power or the relative receiving power of the at least one signal wherein the measurement results are forwarded to the central processing unit which determines the power level. Moreover, the central processing unit interpolates the measurement results in order to determine areas of equal power, namely the interpolated constant power contours. The interpolated constant power contours correspond to contour lines on a map wherein the constant power contours are used to indicate areas with constant power of the signal emitted by the target to be located. In an ideal case, the interpolated constant power contours correspond to concentric circles around the exact location of the target. In other words, the interpolated constant power contours define areas with constant power of the signal emitted by the target to be located.

Hence, the interpolated constant power contours represent areas in which the at least one signal emitted by the target has the same power.

The target may emit at least one signal that propagates in all directions. The at least one receiver unit receives the at least one signal appropriately.

As usual, the direction finding system is used for locating an emitter, namely the target emitting the at least one signal.

According to an aspect, the at least one receiver unit comprises several receivers, in particular wherein each receiver has one antenna. Therefore, the at least one signal emitted by the target are received by several receivers being independently of each other. In some embodiments, each receiver has one antenna such that each receiver is configured to receive the signal emitted by the target. Each receiver may be configured to measure the absolute receiving power or the relative receiving power of the signal emitted by the target.

Generally, the several receivers may be positioned at different locations in order to encircle an area of interest where the target is suspected to be.

Another aspect provides that the several receivers are assigned to a receiver array, for example a circular receiver array encircling the estimated location of the target. Therefore, the estimated location of the target which may be determined previously by using other techniques for direction finding can be encircled by the several receivers forming the receiver array. In an ideal case, the several receivers are arranged such that they establish a circular receiver array. When encircling the estimated location of the target, it is ensured that the location of the target can be determined more accurately, for example the interpolated constant power contours can be determined with a higher accuracy and less computational efforts.

For instance, the several receivers are arranged such that they are evenly spaced. Accordingly, the distances between neighbored receivers are substantially equal.

Further, the central processing unit may be configured to timely align the receivers. Thus, all receivers have the same system reference clock. However, it is not required that the time alignment is as accurate as for a TDoA direction finding system which requires a high bandwidth connection and a high accuracy system clock. In other words, it is not required that the several receivers are on time with a high accuracy as required by the TDoA technique.

According to another aspect, the central processing unit is further configured to plot and/or output the power level. For instance, the power level is plotted on a map. The map may be an electronic map or a paper map such that the central processing unit may be part of a device having an inkjet printer or any other printer unit for plotting the determined power level on a paper map. The electronic map may be displayed on a display unit assigned to the direction finding system, for instance on a handheld user end device or a computer which may be part of the direction finding system. The device displaying the electronic map may comprise the central processing unit. Moreover, the power level determined may be outputted by the central processing unit as data for being processed, displayed and/or plotted by another device connected to the central processing unit. The respective device may be a separate device being (network) connected with the direction finding system, in particular the central processing unit.

Furthermore, the direction finding system may be configured to plot and/or output the interpolated constant power contours. Thus, the constant power contours may also be plotted on the map which may be an electronic map or a paper map. Further, the contours may be outputted as global positioning system (GPS) coordinates such that they can be received by another device being part of the direction finding system, for instance a mobile user end device for directing people to the location of the target. The outputted interpolated constant power contours, for instance as GPS coordinates, may also be used by another device being separate with respect to the direction finding system.

Another aspect provides that the central processing unit is further configured to tune the at least one receiver unit to the frequency of interest. Hence, the direction finding system is set to be sensitive to a certain frequency range (frequency of interest) in order to disregard signals in frequency ranges being not of interest for the user of the system.

In some embodiments, the central processing unit is configured to tune the different receivers of the receiver unit to the same frequency (range) which is the frequency of interest. Thus, it is ensured that the several receivers of the receiver unit are set to receive signals within the same frequency range.

According to a certain embodiment, the direction finding system comprises a direction finding unit for approaching the locating of the target until a significant free space path loss occurs, in particular a change in the received power of 0.1 dB/m or higher. The direction finding unit may be used for limiting the exact location of the target emitting the signals to a radius of about 100 m. This additional direction finding unit may use techniques such as time difference of arrival (TDoA), a heat map, triangulation and/or any other suitable technique for locating a target with a certain accuracy.

Thus, the direction finding system comprising the direction finding unit relates to a two-step approach as the direction finding unit is used for locating the target in a more rough manner. Then, the receiver unit and the central processing unit are used to locate the target by taking the respective power of the signals received into account. The first step as well as the second step can be done automatically such that no hunting on foot is required anymore as already mentioned.

For instance, the at the at least one receiver unit comprises the central processing unit. Thus, the central processing unit is integrated in the at least one receiver unit, in particular in a certain receiver.

The central processing unit in some embodiments is established in a separate device. The central processing unit may be located remotely with regard to the at least one receiver unit, in particular the several receivers. Hence, the receiver unit, in particular each receiver, may be connected to the central processing unit wirelessly.

Generally, the central processing unit may be connected to the at least one receiver unit wirelessly. Thus, the central processing unit and/or the receiver unit may be network connected. For instance, a long-range Wi-Fi connection (LoRa Wi-Fi) is established ensuring long-range connections due to a reduction in bitrate thus achieving a higher distance. Alternatively to the LoRa Wi-Fi, a cellular network can be used for transmitting the data wirelessly. In general, any kind of wireless connection can be used.

Alternatively, the at least one receiver unit is connected to the central processing unit via a cable connection or any other suitable connection member that ensures the required functionality.

Further, embodiments of the present disclosure provide a method for calibrating a direction finding system as mentioned above, wherein a calibration target emitting known signals is moved within an area of interest, for example wherein the area of interest is encircled by the receiver unit, namely the several receivers of the receiver unit.

Thus, a cost-efficient and easy calibration procedure is provided in order to calibrate the radio direction finding system. Particularly, the direction finding system can be field calibrated. Since the several receivers of the receiver unit may be identical, a distant known commercial radio source can be used where the power level is not expected to be different within the area of interest (area of operation). For instance, a distant television (TV) or frequency modulated (FM) radio station is used. The calibration target may be moved around in the area of interest, for instance by car or by walking, in order to train the at least one receiver unit appropriately.

For instance, the direction finding system comprises a neuronal network in order to establish a self-training procedure.

Further, embodiments of the present disclosure provide a method for radio direction finding of a target emitting at least one signal, with the following steps:

Receiving at least one signal from the target by at least one receiver unit of a direction finding system, Determining the power level of an absolute receiving power or a relative receiving power of the at least one signal emitted by the target, and Determining interpolated constant power contours in order to locate the target.

Accordingly, a power of arrival technique is used in order to locate the target within the last meters wherein this technique is further improved by providing the interpolated constant power contours. Thus, the location of the target can be determined with high accuracy when relying on the interpolated constant power contours. As already mentioned, the interpolated constant power contours correspond to contour lines on a map wherein the constant power contours are used to indicate areas with constant power of the signals emitted by the target to be located.

An aspect provides that the receiver unit comprises several receivers, for example wherein the receivers are assigned to a receiver array. The receiver unit comprises several receivers being controlled independently. In some embodiments, the receivers each receive the at least one signal emitted by the target. The several independent receivers ensure to identify the location of the target more precisely. For instance, the several receivers provide a circular receiver array such that the several receivers are located around the estimated location of the target.

Another aspect provides that the receiving power determined and/or the interpolated constant power contours are plotted and/or outputted. The power and/or the interpolated constant power contours may be plotted on an electronic map or a paper map for displaying purposes. Further, the receiving power determined and/or the interpolated constant power contours may be outputted such that they are received by another device. For instance, the interpolated constant power contours are outputted as specific GPS coordinates with the appropriate power level. This data can be used by another device for further processing.

The method may be used in the near field of the target, for example within a radius of about 200 m or less around the target. Thus, the method for radio direction finding using the power of arrival technique is used for the last meters in order to home into the location of the target.

Further, the location of the target may be delimited previously by using another technique, in particular a heat map, triangulation and/or a time difference of arrival, until a significant free space path loss occurs, for example a change in the received power of 0.1 dB/m or higher. Accordingly, the location of the target is previously estimated by known techniques wherein the last meters which are typically not manually are replaced by the method mentioned above in order to provide an automated direction finding of the target for the last meters.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
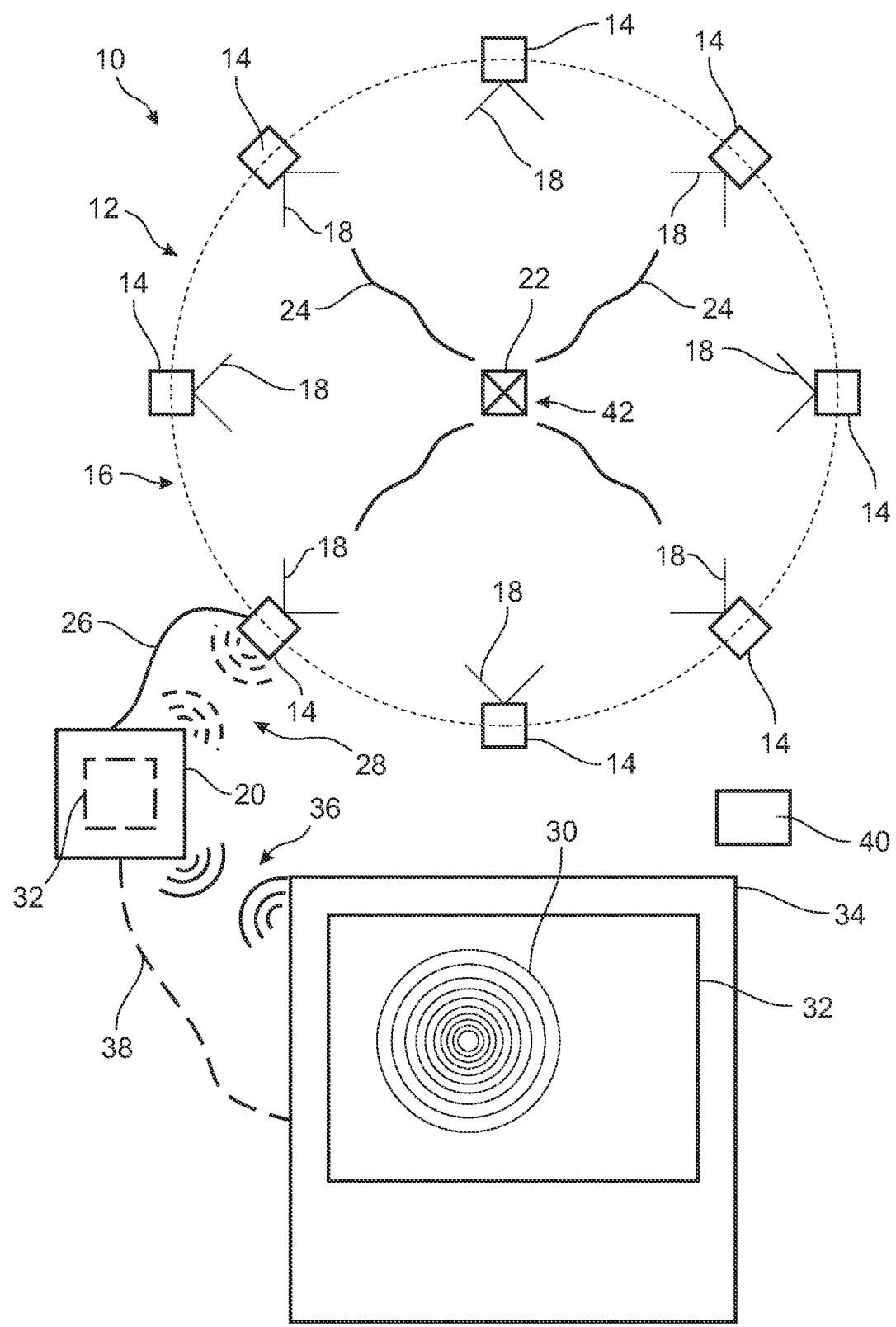
FIG. 1 schematically shows a representative embodiment of a direction finding system according to the present disclosure in operation.

In FIG. 1, a direction finding system 10 is shown for radio direction finding a target emitting at least one signal. As shown in FIG. 1, the direction finding system 10 comprises at least one receiver unit 12 that comprises several receivers 14 that establish a receiver array 16. The several receivers 14 are arranged in a circular manner at different locations such that a circular receiver array 16 is provided.

Further, each of the receivers 14 comprises an antenna 18 that is configured to measure an absolute receiving power or a relative receiving power of the signal emitted by the target to be located. Thus, the antennas 18 are assigned to the at least one receiver unit 12 having the several receivers 14.

The direction finding system 10 also comprises a central processing unit 20 that is connected to the at least one receiver unit 12, namely each of the receivers 14.

In the shown embodiment, the direction finding system 10 is shown in its operational state as the several receivers 14 are positioned around a target 22 that emits signals 24 which are received by the several receivers 14 independently from each other, namely by the antennas 18 assigned to the receivers 14. As shown in FIG. 1, the several receivers 14 of the circular receiver array 16 encircle the estimated location of the target 22.

As mentioned above, the several receivers 14 may measure the absolute receiving power of the signals received individually wherein this data is forwarded to the central processing unit 20 for further processing.

Besides the power of the signal received by each receiver 14, the receivers 14 also transmit their respective geolocation, for instance a GPS position, as well as the time of receipt to the central processing unit 20. This transmission can be done via a cable 26 as indicated in FIG. 1.

Alternatively or even supplementarily, a wireless connection 28 (indicated by dashed lines), for instance a long-range Wi-Fi (LoRa Wi-Fi) connection or a cellular network connection, may be established between the receiver unit 12 and the processing unit 20 for transmitting the appropriate data at least in parts.

In order to ensure that the time information, namely the time of receipt, can be processed with a sufficient reliability, the central processing unit 20 is generally configured to align the several receivers 14 in time. This means that the several receivers 14 of the receiver unit 12 are assigned to the same system reference clock. However, the time alignment accuracy does not have to be at the level required by a time difference of arrival sensor system.

Moreover, the several receivers 14 transmit the data periodically in predefined intervals such that the respective information is gathered by the central processing unit 20 continuously.

The central processing unit 20 is configured to determine the power level of the respective power received via the receiver unit 12. As the central processing unit 20 receives the power information from each receiver 14, the central processing unit 20 is configured to determine the power level of the relative receiving power for each receiver 14 by comparing the different receiving powers of the receivers 14, for instance.

Moreover, geolocation information of the several receivers 14 may be submitted so that their respective locations can be identified or rather mapped.

In addition, the central processing unit 20 that receives the several individual power information received by the several receivers 14 is configured to average the power information collected by the receiver unit 12, in particular the several receivers 14, in order to interpolate the several data points, namely with respect to the power. Thus, the central processing unit 20 is configured to determine interpolated constant power contours 30 representing areas in which the signals 24 emitted by the target 22 have the same power.

In some embodiments, the central processing unit 20 takes the information received by the several receivers 14 into account, namely the receiver unit 12 comprising the several receivers 14, to determine the power level of the respective power received by the receiver unit 12.

The respective power received is the one emitted by the target 22.

Moreover, the central processing unit 20 may determine the absolute receiving power or rather a relative receiving power by comparing the power information of the several receivers 14 with each other. In some embodiments, the power information of one receiver 14 is used as a reference power information.

As discussed, the central processing unit 20 receives power information of the several receivers 14 such that the central processing unit 20 is enabled to interpolate the power information obtained in order to determine interpolated constant power contours 30 assisting in locating the target 22.

In the shown embodiment, these interpolated constant power contours 30 are displayed on a display unit 32 of a separate device 34 for illustrative purposes, which may be part of the direction finding system 10. However, the appropriate information may also be outputted to a device being not part of the direction finding system 10.

The separate device 34 may be handheld user end device, for instance a tablet or a smartphone. Generally, the separate device 34 is a network connected device.

In general, the central processing unit 20 is configured to output at least the interpolated constant power contours 30 determined previously, in particular internally. The output of the interpolated constant power contours 30 may comprise geolocation data such as GPS coordinates which can be processed by the separate device 34 appropriately.

The outputting is established by a wireless connection 36, for instance a long-range Wi-Fi (LoRa Wi-Fi) connection, a Wi-Fi connection, a Bluetooth connection and/or a cellular network connection.

Alternatively or supplementarily, a wired connection 38 may be established between the central processing unit 20 and the separate device 34 as illustrated by the dashed lines.

In addition, the central processing unit 20 is also configured to output the power levels determined earlier such that they can be displayed appropriately.

In the shown embodiment, the interpolated constant power contours 30 are provided by concentric circles around the location of the target 22 which represents the ideal case as the target 22 emits signals in all directions with the same power that decreases over the radius such that the areas of constant power correspond to concentric circles.

Besides the interpolated constant power contours 30, the power levels determined may also be outputted appropriately in order to be illustrated on the separate device 34.

However, the central processing unit 20 may also have or at least be assigned to a display unit 32 for illustrating the interpolated constant power contours 30 and/or the power levels determined directly.

In addition, the central processing unit 20 itself and/or the separate device 34 are/is configured to plot the power levels determined on a map wherein this map may be an electronic map which is displayed via the display unit 32.

Alternatively, the central processing unit 20 is connected to a printer unit such that the power levels determined and/or the interpolated constant power contours 30 determined are plotted on a paper map appropriately.

Accordingly, the separate device 34 may be a printer or the separate device 34 comprises at least a printer unit for printing the appropriate data on a paper map. The separate device 34 may also print the map during this step.

In general, the central processing unit 20 may also be incorporated in one of the several receivers 14 such that the receiver unit 12 comprises the central processing unit 20.

As already mentioned above, the central processing unit 20 is connected to the receiver unit 12, for example the several receivers 14 of the receiver unit 12, in order to receive and process the data forwarded from the receivers 14. However, the central processing unit 20 is also configured to control the receiver unit 12, for example the several receivers 14. For this purpose, the central processing unit 20 is configured to tune the receivers 14 to a frequency of interest in order to ensure that the several receivers 14 are set to receive the same frequency, for example the same frequency range.

The direction finding system 10 uses the so-called power of arrival technique in order to locate the target 22 within the last meters (last mile detection). This technique is used in the nearfield of the target 22, namely within a radius of about 200 m or less around the target 22.

In order to estimate the location of the target 22 previously in a rough manner, a conventional direction finding unit 40 is provided that uses known techniques may be used, for instance a heat map, triangulation and/or a time difference of arrival.

Figure 2:
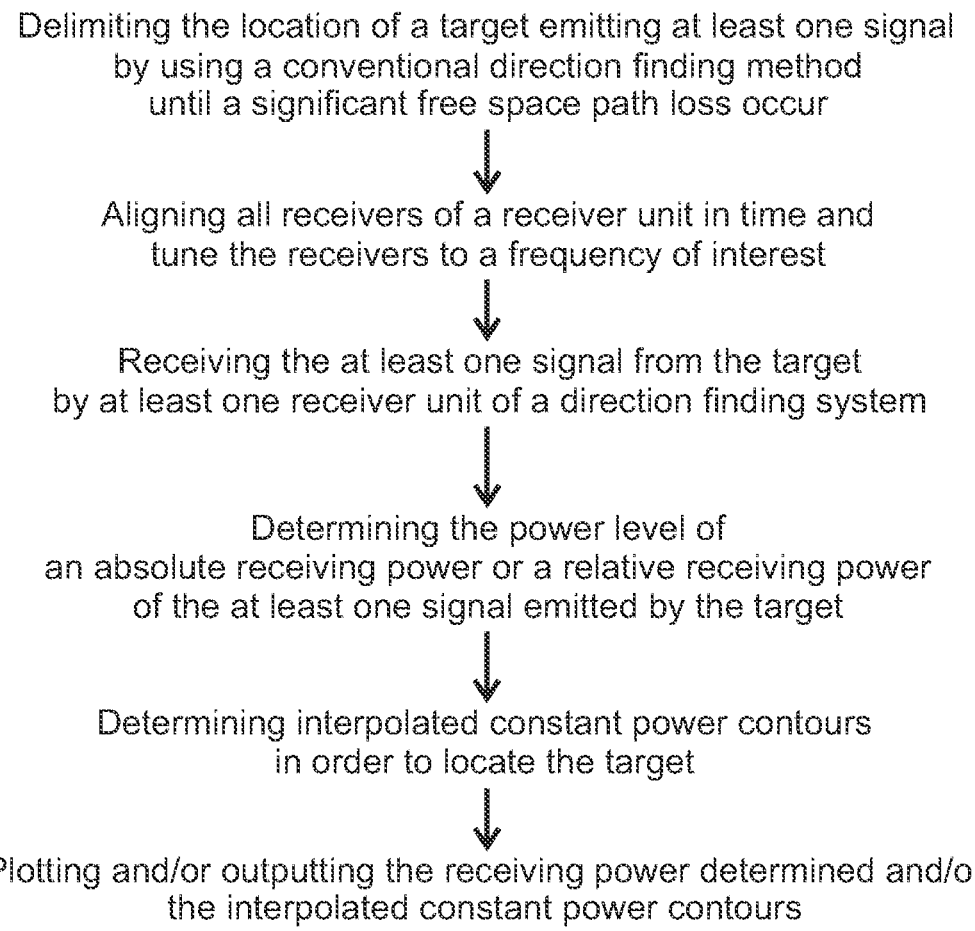
FIG. 2 shows an overview representing a method according to the present disclosure.

As will be described with reference to FIG. 2, the different techniques are combined in order to locate the target 22 in an automated manner such that it is no more required to send out one or more persons to find the exact location by using portable direction finders.

At the beginning, the location of the target 22 is delimited by using one of the several conventional direction finding methods such as a heat map, triangulation and/or a time difference of arrival. The conventional direction finding method can be used to delimit or estimate the location roughly.

Figure 3:
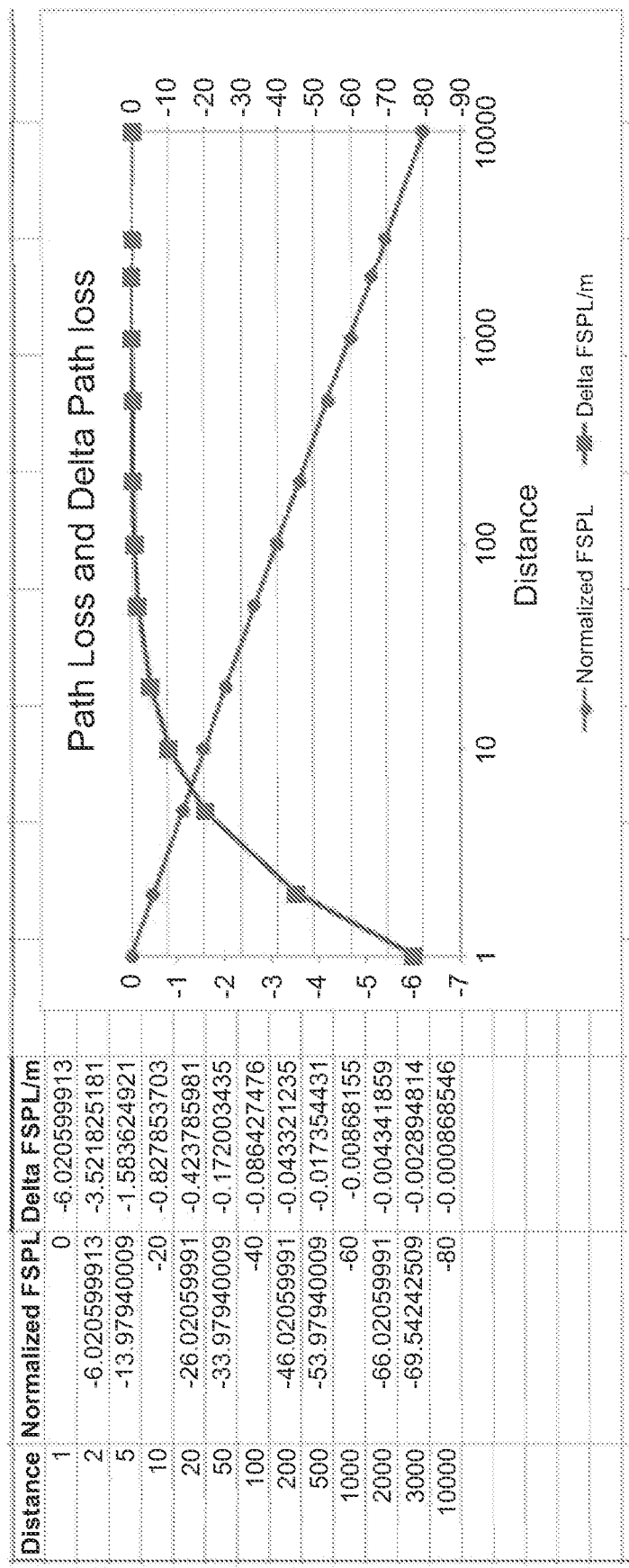
FIG. 3 shows a diagram illustrating the normalized free space path loss over the distance as well as its change per meter.

In some embodiments, the conventional direction finding method is used until a significant free space path loss occurs which typically takes place within a distance of 200 m or less. This is indicated in FIG. 3 wherein a diagram is shown with a normalized free space path loss (normalized FSPL) and its change per meter (Delta FSPL/m) as well as the distance in meters. At a distance of 100 m, the received power decreases by 0.1 dB/m or more.

The diagram and the corresponding table of FIG. 3 also show that, at a distance of 100 m, there is a drop of around 0.1 dB in power for every meter further away from the target 22 closing to the target 22, at 10 m, the power decay increases to 0.8 dB/m and so on.

This effect is used by the power of arrival technique in order to locate the target 22 after the accuracy or rather resolution of the conventional direction finding method would require a manual hunt.

For this purpose, the several low-cost unmanned receivers 14 are installed around the area of interest being defined by the roughly estimated location of the target 22.

Then, the receivers 14 are aligned in time and tuned to the frequency of interest. This is done by the central processing unit 20 that controls the receiver unit 12 appropriately. Thus, it is ensured that the target 22, in particular the at least one signal emitted by the target 22, is received by each receiver 14.

The receivers 14 transmit the receiving power of the at least one signal emitted by the target 22, their geolocation (GPS position) and the time of receipt such that the central processing unit 20 receives this information for further processing. The central processing unit 20 only collects this information from each receiver 14 such that a LoRa Wi-Fi connection is sufficient for the data transfer.

The data collected is then processed in order to determine power levels, for instance relative power levels as the central processing unit 20 receives the appropriate data from each receiver 14 independently.

Further, the central processing unit 20 averages (interpolates) the respective power (levels) determined in order to determine the constant power contours 30 which will point to the location of the target 22. Thus, visual confirmation of the location of the target 22 is obtained.

The constant power contours 30 and/or the power levels are plotted on a map, for instance an electronic one or a paper one, and/or outputted to another device for being processed by this device, namely the separate device 34.

In general, the location of the target 22 is estimated by known techniques as mentioned above in a rough manner. Then, an array of low-cost receivers 14 establishing the receiver unit 12 are deployed within the last 100 m radius around the estimated location of the target 22 in order to detect the power of the signals emitted in an automatic manner. These several receivers 14 can be deployed within a wireless network, for instance a LoRa Wi-Fi or a cellular network, for data transmission.

Accordingly, a cost-efficient and automated direction finding system 10 as well as a method for radio direction finding of the target 22 in an automated manner are provided.

The direction finding system 10 described above can be easily calibrated by using a known transmitter as a calibration target 42 that emits known electromagnetic signals. The calibration target 42 can be moved within the area of interest in order to train the direction finding system 10. For instance, the calibration target 42 transmits known commercial radio signals where the power level is not expected to be different within the area of interest (area of operation).

Thus, a distant television (TV) or frequency modulated (FM) radio station can be used as the calibration target 42.

Accordingly, a cost-efficient and simple calibration method is provided.

It should be understood that each block of the block diagrams and/or flowchart illustrations, and any combination of blocks in the block diagrams and flowchart illustrations described herein and/or illustrated in the FIGURES, could be implemented by special purpose hardware-based computer systems that perform the specified functions or operations, or combinations of special purpose hardware and computer instructions. In some embodiments, the central processing unit 20 is configured as a special purpose computing device that implements the functionality or methodologies of the blocks, flowcharts, etc., disclosed herein.

It should be also understood that each block of any of the block diagrams and/or flowchart illustrations, respectively, and described herein and/or illustrated in the FIGURES may be implemented in part by computer program instructions, e.g., as logical steps or operations executing on a processor, such as processing unit 20, in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the block diagrams, flowchart block or blocks, and any method descriptions herein, etc. The term computer can include any processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A direction finding system for locating a target emitting at least one signal, the system being used for locating the target emitting the at least one signal, the system comprising:
- a separately formed direction finding unit for approaching a location of the target until a significant change per meter of a free space path loss occurs, wherein the direction finding unit is used for estimating the location of the target in a rough manner;
- at least one receiver unit with several receivers, each receiver having at least one antenna, wherein the several receivers are located around the estimated location of the target; and
- a central processing unit connected to the at least one receiver unit,
- wherein the receivers of the at least one receiver unit are configured to measure an absolute receiving power of the signal emitted by the target, thereby obtaining measurement results, wherein the at least one receiver unit is configured to forward the measurement results to the central processing unit,
- wherein the receivers are configured to transmit, along with the absolute receiving power of the signal received, their respective geolocation as well as the time of receipt to the central processing unit,
- wherein the central processing unit is configured to:
  - determine the power level of the absolute receiving power received by the receivers of the at least one receiver unit or to determine the power level of a relative receiving power by comparing the power information of the several receivers with each other, and
  - interpolate the measurement results in order to determine areas of equal power, thereby determining interpolated constant power contours for locating the target, the interpolated constant power contours representing areas in which the at least one signal emitted by the target has the same power level.

2. The system according to claim 1, wherein the several receivers are assigned to a receiver array.

3. The system according to claim 2, wherein the several receivers are assigned to a circular receiver array encircling the estimated location of the target.

4. The system according to claim 1, wherein the central processing unit is configured to timely align the receivers.

5. The system according to claim 1, wherein the central processing unit is further configured to plot and/or output the power level.

6. The system according to claim 1, wherein the direction finding system is configured to plot and/or output the interpolated constant power contours.

7. The system according to claim 1, wherein the central processing unit is further configured to tune the at least one receiver unit to the frequency of interest.

8. The system according to claim 1, wherein the significant change per meter of the free space path loss is 0.1 dB/m or higher.

9. The system according to claim 1, wherein the at least one receiver unit comprises the central processing unit or wherein the central processing unit is established in a separate device.

10. The system according to claim 9, wherein the central processing unit is connected to the at least one receiver unit wirelessly.

11. A method for locating a target emitting at least one signal, comprising:
- delimiting a location of the target by using a separately formed direction finding unit to approach a location of the target until a significant change per meter of the free space path loss occurs in the near field of the target such that the location of the target is estimated in a rough manner;
- receiving at least one signal from the target by at least one receiver unit of a system, wherein the at least one receiver unit has several receivers, each receiver having at least one antenna, wherein the several receivers are located around the estimated location of the target,
- measuring, by the several receivers of the receiver unit, an absolute receiving power of the signal emitted by the target, thereby obtaining measurement results, wherein the several receivers are configured to transmit, along with the power of the signal received, their respective geolocation as well as the time of receipt to a central processing unit;
- determining, by the central processing unit, the power level of an absolute receiving power or a relative receiving power of the at least one signal emitted by the target;
- interpolating the measurement results in order to determine areas of equal power; and
- determining interpolated constant power contours for locating the target, wherein the interpolated constant power contours represent areas in which the at least one signal emitted by the target has the same power level.

12. The method according to claim 11, wherein the receiving power determined and/or the interpolated constant power contours are plotted and/or outputted.

* * * * *